United States Patent
Sophiea et al.

(10) Patent No.: US 6,277,903 B1
(45) Date of Patent: Aug. 21, 2001

(54) SOUND DAMPING COATING OF FLEXIBLE AND RIGID EPOXY RESINS

(75) Inventors: Daniel P. Sophiea, Lake Orion; Dwight K. Hoffman, Midland; Xiao Hong, Madison Heights; Gloria Hsu, Bloomfield, all of MI (US)

(73) Assignees: The Dow Chemical Company, Midland; Essex Specialty Products, Inc., Auburn Hills, both of MI (US)

( * ) Notice: Subject to any disclaimer, the term of this patent is extended or adjusted under 35 U.S.C. 154(b) by 0 days.

(21) Appl. No.: 09/158,193

(22) Filed: Sep. 21, 1998

Related U.S. Application Data

(60) Provisional application No. 60/059,947, filed on Sep. 26, 1997.

(51) Int. Cl.$^7$ ............... B05D 1/02; B32B 15/08; C08K 7/16; C08K 3/22; C08L 63/02
(52) U.S. Cl. ............... 523/428; 427/386; 428/413; 428/418; 523/427; 525/524
(58) Field of Search ............... 427/386; 428/413, 428/418; 525/524; 523/427, 428

(56) References Cited

U.S. PATENT DOCUMENTS

| | | | |
|---|---|---|---|
| 3,169,881 | 2/1965 | Bodine, Jr. ............... | 117/45 |
| 3,365,516 | 1/1968 | Prescott et al. ............... | 260/830 |
| 3,420,729 | * 1/1969 | Roberts ............... | 428/36.6 |
| 3,518,217 | 6/1970 | Irwin et al. ............... | 260/29.2 |
| 3,894,169 | 7/1975 | Miller ............... | 428/425 |
| 4,346,782 | 8/1982 | Böhm ............... | 181/207 |
| 4,900,608 | * 2/1990 | Stamper ............... | 428/413 |
| 4,910,270 | 3/1990 | Maekawa et al. ............... | 525/532 |
| 5,308,895 | * 5/1994 | Gan et al. ............... | 523/445 |
| 5,368,916 | 11/1994 | Fujimoto et al. ............... | 428/215 |
| 5,435,842 | 7/1995 | Mukaida et al. ............... | 106/672 |
| 5,747,565 | 5/1998 | Ono et al. ............... | 523/413 |
| 5,929,141 | * 7/1999 | Lau et al. ............... | 523/466 |
| 5,965,673 | * 10/1999 | Hermansen et al. ............... | 523/466 |

FOREIGN PATENT DOCUMENTS

| | | |
|---|---|---|
| 2657969 | 6/1978 | (DE) . |
| 077987 A1 | 5/1983 | (EP) . |
| 077987 B1 | 5/1983 | (EP) . |
| 407157 A2 | 1/1991 | (EP) . |
| 551 063 A1 | 7/1993 | (EP) . |
| 590 975 A1 | 4/1994 | (EP) . |
| 1198004 | 7/1970 | (GB) . |
| 2285049 | 6/1995 | (GB) . |
| 2-11686 | * 1/1990 | (JP) . |

OTHER PUBLICATIONS

Atomotive Technology Group, inc., "Performance Benefits Of A New Spray Applied Automotive Damping Material", IBC '97, pp. 145–150, 1997.

Derwent Abstract, 78–87987A/49, Germany 2723491, "Protective coating compsns., e.g. for cars—contain viscous–elastic unhardened plastics esp. Polyester or epoxy resin".

Derwent Abstract, 91–010113/02, EP–407157, "Vibration–damping material with excellent performance—comprises epoxy resins, curing agent and filler".

Derwent Abstract, 93–220829/28, EP–551063, "Protective coating compsns. for under–body coatings—comprising solid hardener, filler and di:epoxide resin(s) avoiding the use of PVC plastisols".

Derwent Abstract, 94–111357/14, EP–590975, "Low viscosity, solvent free, one component epoxy adhesives—comprising polyfunctional epoxy cpd. Liq. At room temp., reactive diluent and microencapsulated amine latent curing agent".

Derwent Abstract, 92–148180/18, Romania 100918. "Corrosion and sound proofing compsn.—consists of epoxy resins mixed with dehydrated coal tar incorporating fly ash".

Derwent Abstract, 89–186000/26, Germany 267696, "Gripping force measurement sensor for triple finger gripper—has strain sensors on bars connecting star wheel inner and outer rings".

Derwent Abstract, 83–44608K/19, EP–77987, "Vibration damper bondable to panels e.g. of cars—comprises three–layered laminate of meltable bonding layer, viscoelastic layer and constraining layer e.g. of epoxy resin".

Derwent Abstract, 94–269599/33, Japan 06200123, "Epoxy resin curable compsn. contg. hydrosilyl cpd. And silica powder—used in sealants, adhesives and coatings for automobile underbodies".

Derwent Abstract, 95–213001/28, Japan 07126347, "Compen. for damping materials to suppress vibration in automobiles, trans etc.—contg. Epoxy resins, acrylonitrile/conjugated diene rubber contg. carboxyl Gp., inorganic filler and curing agent".

(List continued on next page.)

Primary Examiner—Robert E. L. Sellers
(74) Attorney, Agent, or Firm—Norman L. Sims

(57) ABSTRACT

The invention is a sprayable coating having noise vibration and harshness reduction or absorption properties. Such composition comprises from about 10 to about 60 percent of the flexible epoxy resin, from about 5 to about 40 percent by weight of a rigid epoxy resin formulation, and a curing agent for the epoxy moieties of the two resins. In another embodiment, the invention is a method of coating a substrate to reduce the impact of noise vibration and harshness on the substrate or users of the substrate, which process comprises spraying the above defined composition on to a substrate and curing the resin on such substrate. In yet another embodiment the invention is a coated substrate described herein before having enhanced noise vibration and harshness properties.

19 Claims, No Drawings

OTHER PUBLICATIONS

Derwent Abstract, 97–115452/11, Japan 09003305, "Damping material compsns. with good performance in high frequency region—comprises epoxy resin, acrylonitrile-conjugate diene copolymer rubber, inorganic filler, particulate or needle–like additive with specified dielectric constant and curing agent".

Derwent Abstract, 90–221277/29, Japan 02150484. "Structural adhesive for car assembly line—consisting of rubber – modified epoxy resin, other epoxy resins and latent curing agent".

Derwent Abstract, 91–083232/12, Japan 03028234, "Vibration damping material with reduced temp. Shift—is obtd. By compounding mica and chopped glass strands with liq. Epoxy resin".

Derwent Abstract, 93–365304/46, Japan 05271389, One–pack flexible epoxy resin compasn. for sealing cpds. And adhesives—contains epoxy resin, ketimine, modified silicone resin and its catalyst and a dehydrant, is storage stable, easily cured and has good flexibility.

Derwent Abstract, 80–19456C/11, Japan 55016073, "Epoxy resin compsn. Contg. Heat–activated hardener and foaming agent—for reinforcement, vibration damping and sound–proofing of metal sheets".

Derwent Abstract, 80–63277C/36, Japan 55098263, "Sound insulating coating compsn.—comprising vehicle contg. Styrene–butadiene rubber and/or petroleum resin, filler, alkali modified sludge and vulcaniser".

Derwent Abstract, 89–217488/30, Japan 01156151, "Sound proofing compsn. For fixing parts to vehicle–comprises photocurable resin binder and particulate filler, giving specified hardness".

Derwent Abstract, 68–12574Q/00, Belgium 712,355, "Cured epoxy sound absorbing materials made by curing epoxy resins with propylene oxide amines".

Derwent Abstract, 90–059557/09, German 271,911, "Filled epoxy resin–based echo–or boom–removing materials contain epoxy resin with epoxide equivalent 300–600 and molecular weight 600–1200, combined with DBP and isobutyl and/or phenyl glycidyl ether".

Derwent Abstract, 78–47960A/27, German 2657969, Tough resilient polyester or epoxy resin optionally containing fillers used as impact–resistant, anti–corrosive, noise reducing coating.

Chemical Abstract, 121:37079a, "Alternatives to PVC", 1993.

Chemical Abstract, 92:95675k, "New undercoatings for rust proofing automobiles and new corrosion–reducing waxes", 1979.

Chemical Abstract, 119:74663r, "Anticorrosive thick epoxy resin coatings", Feb. 28, 1992.

WPAT, Patent No. DE2657969, Abstract, Jun. 29, 1978.

* cited by examiner

SOUND DAMPING COATING OF FLEXIBLE AND RIGID EPOXY RESINS

CROSS REFERENCE STATEMENT

This application claims the benefit of U.S. Provisional Application Ser. No. 60/059,947 filed Sep. 26, 1997.

BACKGROUND OF INVENTION

This application relates to flexible epoxy coatings which have sound damping properties and to processes for applying such coatings to substrates and Many transportation vehicles, electronic device apparatuses, and machines are subjected to noise and vibration due to the environments within which they are placed or used. Such noise and vibration can present problems in their use or function and may be annoying or harmful to the users of such devices or apparatuses. Therefore, there is a need to reduce the impact of such noise and vibration on the apparatuses, devices and users thereof. In many applications, noise and vibration is reduced by placing in or fixing to such vehicles or devices extensional dampers. Extensional dampers are composite pads comprised of a viscoelastic polymer or resin, filler and additive composition layer having on one side of such layer a pressure sensitive or hot melt adhesive. These are applied to the vibrating substrate. Such plates are difficult to affix to or shape around odd shaped parts, such as the interior of automobiles.

In addition, certain coatings are placed in or sprayed on parts of the underside exterior painted surfaces of such transportation vehicles. Such coatings are usually used for corrosion protection by providing abrasion or stone-impact resistance for the painted surfaces.

Typically such coatings are tough, elastic polyvinyl chloride based and do not provide significant noise and vibration reduction. In some embodiments, epoxy or modified epoxy resin formulations are used as electro-deposition coatings for corrosion protection. Unfortunately, epoxy or modified epoxy resin formulations typically form brittle or highly cross-linked networks, at thickness' which have limited effect with respect to reducing the impact of noise and vibration on the user of such devices.

What is needed is a multifunctional coating which provides noise and vibration reduction in combination with corrosion protection and anti-abrasion properties. What is further needed is such a coating which is sprayable and can easily be placed or coated on odd shaped objects.

SUMMARY OF INVENTION

The invention is a multifunctional, sprayable coating having noise and vibration attenuation or absorption properties. Such composition comprises from about 10 to about 60 percent of the flexible epoxy resin, from about 5 to about 40 percent by weight of a liquid bisphenol based epoxy resin formulation, and a curing agent for the epoxy moieties of the two resins.

In another embodiment, the invention is a method of coating a substrate to improve the noise and vibration properties of the substrate, which process comprises spraying the above defined composition on to a substrate and curing the resin on such substrate.

In yet another embodiment the invention is a coated substrate described hereinbefore having enhanced noise and vibration attenuation.

The coatings of the invention provide for good noise and vibration attenuation, excellent corrosion resistance, impact resistance and abrasion resistance. The process of the invention allows for coating irregular shaped objects in a cost effective way and allows complete surface contact of the coating on the substrate.

DETAILED DESCRIPTION OF THE INVENTION

Important in developing a coating which has good sound abatement properties, abrasion resistance, impact resistance, corrosion resistance and substrate wet out, is the selection of the epoxy resins used in the formulation or coating. More particularly a balance of flexible epoxy resins and rigid epoxy resins achieves the desired results. As used herein, rigid epoxy resins refer to epoxy resins having bisphenol moieties in the backbone of the epoxy resin. Representative of preferred bisphenol resins useful in this invention are those disclosed in U.S. Pat. No. 5,308,895 at column 8, line 6 and represented by Formula 6, relevant portions of such patent are incorporated herein by reference. Preferably the rigid epoxy resin is a liquid epoxy resin or a mixture of a solid epoxy resin dispersed in a liquid epoxy resin. The most preferred rigid epoxy resins are bisphenol-A based epoxy resins and bisphenol-F based epoxy resins.

Flexible epoxy resins as used herein refer to epoxy resins having elastomeric chains in the backbone. Representative of such elastomeric chains are polyether chains which are preferably prepared from one or more alkylene oxides. Representative examples of these flexible epoxy resins are those described in U.S. Pat. No. 5,308,895 at column 8, line 9 and formula 9 and the description thereof following, relevant portions of such description are incorporated herein by reference. Preferably the flexible epoxy resin contains in its backbone ethylene oxide, propylene oxide or a mixture thereof.

The mixture of flexible and rigid epoxy resins should be such that the peak glass transition temperature of the formulation, as determined by dynamic mechanical measurements of the loss modulus, is about −30° C. or greater and preferably about 10° C. or greater. Preferably the peak glass transition temperature is about 100° C. or less and more preferably about 50° C. or less. In a preferred embodiment, the glass transition should be a broad and high glass transition with respect to temperature and frequency, preferably the breadth of the glass transition temperature is greater than about 80° C. and more preferably about 100° C. Preferably the flexible epoxy resin is present in the formulation in an amount of about 10 percent by weight or greater, more preferably about 20 percent by weight or greater, even more preferably about 25 percent by weight or greater based on the weight of the formulation. Preferably the amount of the flexible epoxy resin present in the formulation is about 60 percent by weight or less and more preferably about 50 percent by weight or less. A preferred flexible epoxy resin is DER™ 732 epoxy resin available from The Dow Chemical Company.

The amount of rigid epoxy resin present is preferably about 5 percent by weight or greater and more preferably about 10 percent by weight or greater based on the weight of the formulation. The amount of rigid epoxy resin present in the formulation is preferably about 40 percent by weight or less and more preferably about 30 percent by weight or less based on the weight of the formulation.

The formulation should have a viscosity such that the formulation is sprayable using a airless sprayer which atomizes the formulation. Preferably the formulation has a viscosity of about 150,000 centipoise or less and more preferably about 100,000 centipoise or less.

The formulation further comprises a curing agent for the epoxy resin. The curing agent can be any curing agent useful with epoxy resins and known to one skilled in the art. Representative curing agents are disclosed in U.S. Pat. No. 5,308,895 at column 11, line 8 to column 12 line 47 incorporated herein by reference. More preferably the curing agent is an amine terminated polyether, such as Jeffamine amine terminated polyether available from Huntsman Chemical, anhydrides, including dianhydrides, and cyandiamides or dicyandiamides and derivatives thereof. Most preferred curing agents are the dicyandiamides and the derivatives thereof. The choice of the curing agent will effect the form of the composition, whether it is a one-part or a two-part composition, shelf stability, final performance properties and the curing temperature of the composition. For a two-component composition, an amine terminated polyether or an anhydride curing agent may be used. For a one-component formulation, a dicyandiamide curing agent may be used.

The curing agent in relation to the epoxy resin is used in an amount such that the ratio of epoxy groups to epoxy reactive groups is about 0.7 to 1 to about 1.3 to 1. The curing agent may be present in an amount of from about 0.5 to about 7 percent by weight based on the amount of the total formulation. It is preferable that there be a slight excess of epoxy moieties to epoxy reactive moieties such that the range is about 1.05 to 1 to about 1.1 to 1.

The composition may further comprise a catalyst for the reaction of an epoxy resin with an epoxy curative compound. Such catalysts are well known to those skilled in the art, and include those described in U.S. Pat. No. 5,344,856, relevant portions incorporated herein by reference. The preferred classes of catalysts are the ureas, imidazoles, and boron trihalides with the ureas being the most preferred catalysts. Of the boron trihalides, boron triflouride is the most preferred because formulations using this catalyst demonstrate significantly better stability when compared to other boron trihalides. The catalyst amount used may vary depending upon the desired reactivity and shelf stability. Preferably the catalyst is present in an amount of about 0.1 to about 5 weight percent based on the weight of the weight of the formulation.

The formulation may further contain a plasticizer to modify Theological properties to a desired consistency. The plasticizer should be free of water, inert to isocyanate groups, and compatible with the polymer. Such material may be added to the reaction mixtures for preparing the prepolymer or the adduct, or to the mixture for preparing the final formulation, but is preferably added to the reaction mixtures for preparing the prepolymer, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, trichloropropylphosphate, epoxy plasticizers, toluene-sulfamide, chloroparaffins, adipic acid esters, xylene, 1-methyl-2-pyrrolidinone and toluene. The amount of plasticizer used is that amount sufficient to give the desired rheological properties and disperse the components in the formulation. Preferably the plasticizer is present in an amount of about 0 percent by weight or greater, more preferably about 0.5 percent by weight or greater based on formulation. The plasticizer is preferably present in an amount of about 30 percent by weight or less, more preferably about 20 percent by weight or less and most preferably about 10 percent by weight or less based on the weight of the formulation.

The formulation may further comprise one or more fillers. Fillers are used to control the viscosity, rheology, shelf stability, specific gravity and cured performance properties, such as vibration damping, corrosion resistance, impact resistance and abrasion resistance. The fillers may be spherical or platy. As used herein platy means the particles have a high aspect ratio. High aspect ratio fillers include as talc, mica and graphite. Preferred high aspect ratio fillers include Phologopite mica having a median particle size of about 20 to about 70 microns (micrometers) and most preferably about 50 microns (micrometers). High aspect ratio fillers are used to control vibration damping properties. Spherical fillers include carbonates. Spherical fillers are used to control density and rheology, viscosity and cost. Preferably a package of a spherical filler such as calcium carbonate and a high aspect ratio filler are both present. Preferably the spherical filler is present in an amount of about 0 percent by weight or greater, and more preferably about 10 percent by weight or greater. Preferably the spherical filler is present in an amount of about 50 percent by weight or less and more preferably about 30 percent by weight or less. Preferably the high aspect ratio fillers is present in an amount of about 5 percent by weight or greater, and more preferably in an amount of about 10 percent by weight or greater. Preferably the high aspect ratio fillers is present in an amount of about 40 percent by weight or less and more preferably in an amount of about 30 percent by weight or less.

In another embodiment, the formulation may further comprise a reactive diluent such as mono-functional epoxide and other reactive diluents known to those skilled in the art. One preferred reactive diluent is tertiary butyl glycidyl ether.

The formulation of the invention may be a two-part or a one-part formulation depending on the curing agent and the temperature at which the curing agent begins to cure the epoxy resin. If the curing agent is reactive at room temperature, the formulation must be a two-part formulation and if the curing agent is reactive at significantly higher temperatures, the formulation can be a one or a two-part formulation with the cure initiated by exposing the formulation to heat.

The process of the invention involves contacting the formulation with a substrate. The substrate can be any substrate for which corrosion protection and abrasion protection and sound damping or abatement is desired. Such substrate can be metal, wood, plastic, fiber reinforced plastic and the like. The formulation can be used in a wide variety of industries including the automotive industry, in the appliance industry and in the construction industry. The formulation is particularly advantageous in that it is sprayable and can be sprayed on irregular shaped objects such as the bodies of automobiles.

The formulation of the invention can be contacted with the substrate by any means known in the art, for instance by painting on, spraying on, or spreading it on the substrate. Preferably the composition is sprayed on the substrate. Preferably a high volume high pressure airless sprayer which atomizes the composition is used. More preferably the airless sprayer has a 45 to 1 ratio with a double ball or check valve style pump and with an inlet air pressure of about 50 to about 90 psi (344 kPa to 621 kPa). Once the formulation is contacted with the substrate, the formulation is allowed to cure. For those compositions where room temperature cure occurs no further steps need to be taken. Room temperature cure generally occurs with anhydride and amine terminated polyether curing agents. With cyandiamide or dicyandiamide curing agents the coated substrate should be exposed to elevated temperatures to affect cure.

1,12-dodecyl anhydride can be used in one-part compositions and cures at elevated temperatures. Preferable lower cure temperatures are generally about 0° C. or greater more preferably about 40° C. or greater and most preferably about 60° C. or greater. Preferably the cure temperature is about 190° C. or less, more preferably about 150° C. or less and most preferably about 140° C. or less. Another aspect to the invention is a substrate as described hereinbefore having a coating thereon a sound damping abrasion resistant, corrosion resistant coating. Preferably the coating is about 1.5 mm or greater and preferably the coating is about 2.5 mm or less.

The coating of the invention preferably provides a composite loss factor of about 0.05 or greater as measured using the composite loss factor test protocol given by SAE J1637 with a 2 mm coating. More preferably the peak loss modulus of the coating should be greater than about 300 units in the desired operating temperature range. As used herein, the following test protocol were used to test coated substrates of the invention: sound abatement properties are measured according to SAE J1637 *Laboratory Measurement Of The Damping Properties Of Materials On A Supporting Steel Beam* and or dynamic mechanical analysis (tangent delta at resonant frequency of 2 Hz over a temperature sweep at 5°0 C./minute); corrosion resistance is measured by subjecting coated panels to 336 hour in salt fog, 168 hour in 100 percent relative humidity at 38° C. and 336 hour heat aging at 70° C. and measuring loss of adhesion or other critical properties; abrasion resistance is measured according to ASTM D968-93 with modified abrasive; stone impact resistance is measured with a Gravelometer using 8–12 mm stones and coated panels equilibrated at −30° C. according to SAE J400 Method II Specific Embodiments.

The following examples are provided to illustrate the invention, but are not intended to limit the scope thereof. All parts and percentages are by weight unless otherwise indicated.

In the following Examples the coatings were prepared by batch mixing the components under high speed, high shear agitation. The process includes three steps: all liquid resins, curatives and platy fillers are mixed first for 20 minutes and degassed at 30 mmHg; spherical fillers and glass spheres are added and the mixture is mixed for 20 minutes and degassed at 30 mmHg; fumed silica is then added and the mixture is mixed for 10 minutes and degassed at 30 mmHg.

The coatings were applied to the substrates made of electrocoated, cold rolled steel panels by the following procedure. The material was applied to the panels either by hand using a draw down bar or by spraying with an airless spray pump operating at 80 psi (0.552 mPa)inlet pressure and 3600 psi (24.8 mPa) dynamic pressure attached to a ⅜ inch (9.5 mm) whip hose and 0.008 inch (0.20) self cleaning nozzle. The components of the coatings tested are compiled in the tables below.

Unless otherwise stated, all samples of the coatings on the panels were cured 30 minutes at 163° C.

The following tests were performed on the samples: press flow viscosity; tensile strength and elongation ASTM D638; shear strength ASTM D1002; heat aging; salt spray resistance; humidity resistance; chip resistance; abrasion resistance ASTM D968-93; damping SAE J1637 at 0, 20 and 40° C. The press flow viscosity is performed by pressing 20 g of the material under a pressure of 40 psi (276 kPa), through an orifice having a diameter of 0.052 inches (0.13 cm)at 77° F. (25° C.) and recording how long it takes for the material to pass through the orifice. The heat aging test is performed on a 20 mil (0.05 cm) film adhered to a substrate of electro-coated cold rolled steel by heating it at 70° C. and ambient relative humidity for 336 hours. The salt spray test is performed by exposing a 20 mil (0.05 cm) film on a substrate of electro-coated, cold rolled steel to salt spray at a temperature of 23° C. for 336 hours. The humidity test is performed by exposing a 20 mil film on a substrate of electro-coated cold rolled steel to 100 percent relative humidity at 38° C. for 168 hours. The chip resistance test was (stone impact resistance) was measured with a Gravelometer using 8–12 mm stones and coated panels equilibrated at −30° C. according to SAE J400 Method II.

EXAMPLE 1

| Components of Formulation | Comparative Example 1 Part by Weight | Example 1 Part by Weight |
|---|---|---|
| Mixed Alkyl Phthalate Ester | 30.34 | 0 |
| Talc | 0 | 24 |
| Glass Spheres | 18.4 | 4.4 |
| Bis A Epoxy Resin EEW 187 | 0 | 12.8 |
| Bis A/Aliphatic Diepoxide Resin Polyglycol based mixture EEW 280 | 0 | 7.1 |
| Aliphatic Diepoxide Resin Polyglycol based EEW 320 | 0 | 29.6 |
| Dicyandiamide | 0 | 3.5 |
| Phenyl dimethyl urea (PDMU) | 0 | 1 |
| Fumed Silica | 0 | 2.5 |
| Pigment | 1 | 0.3 |
| Poly vinyl chloride (PVC) Homopolymer | 20.8 | 0 |
| Calcium Carbonate | 17.1 | 12.1 |
| Press Flow Viscosity (SEC) | 70 | 43 |
| Properties: | | |
| Tensile Strength (psi) | 163 | 1390 |
| | (1,124 kPa) | (9,584 kPa) |
| Elongation (%) | 160% | 47% |
| Shear Strength (psi) | 250 | 1,046 |
| | (1,724 kPa) | (7,211 kPa) |
| Heat Aging | no cracks or adhesion loss | no cracks or adhesion loss |
| Salt Spray | no cracks or adhesion loss | no cracks or adhesion loss |
| Humidity | no cracks or adhesion loss | no cracks or adhesion loss |
| Chip Resistance @ −30 C pts stones | 10 | 90 |
| Abrasion Resistance L/mil | 0.26 | 0.86 |
| Damping CLF @ | | |
| 0 deg C. | 0.044 | 0.085 |
| 20 deg C. | 0.025 | 0.22 |
| 40 deg C. | 0.025 | 0.089 |

Example 1 demonstrates the multifunctional attributes of the epoxy coating, providing the necessary physical and mechanical properties for protective coating as well as vibration damping.

EXAMPLE 2

| COMPOUND | Comparative Example 2 Parts by Weight | Example 2 Parts by Weight |
|---|---|---|
| Talc | 0 | 31 |
| Bis A Epoxy Resin EEW = 187 | 7.8 | 7.8 |
| Bis A/Aliphatic Diepoxide Resin Polyglcol based mixture EEW = 280 | 19.1 | 19.1 |

-continued

| COMPOUND | Comparative Example 2 Parts by Weight | Example 2 Parts by Weight |
|---|---|---|
| Aliphatic Diepoxide Resin Polyglycol based EEW = 320 | 23.8 | 23.8 |
| Dicyandiamide | 3.5 | 3.5 |
| PDMU | 1 | 1 |
| Calcium Carbonate | 31 | 0 |
| Fumed Silica | 1.2 | 1.2 |
| Pigment | 0.4 | 0.4 |
| Calcium Carbonate | 11.2 | 11.2 |
| Properties: Damping (SAE J1637) Thickness 2 mm CLF @ | | |
| 0 deg C. | 0.05 | 0.06 |
| 20 deg C. | 0.16 | 0.23 |
| 40 deg C. | 0.08 | 0.11 |

Example 2 demonstrates damping improvement gained through the use of high aspect ratio talc while maintaining low viscosity and good rheology necessary for spray application.

EXAMPLES 3 and 4

| COMPOUND | Comparative Example Parts by Weight | Example 3 Parts by Weight | Example 4 Parts by Weight |
|---|---|---|---|
| Bis A Epoxy Resin EEW = 187 | 12.8 | 12.8 | 15 |
| Bis A/Aliphatic Diepoxide Resin Polyglycol based mixture EEW = 280 | 7.1 | 7.6 | 7 |
| Aliphatic Diepoxide Resin Polyglycol based EEW = 320 | 29.6 | 29.6 | 27.2 |
| Dicyandiamide | 3.5 | 3.5 | 2.8 |
| PDMU | 1 | 1 | 1 |
| Glass Spheres | 4.4 | 4.4 | 4.4 |
| Mica (50 microns) | 0 | 10 | 15 |
| Talc | 24 | 24 | 23.5 |
| Fumed Silica | 2.5 | 2 | 1.6 |
| Pigment | 0.3 | 0.3 | 0.3 |
| Calcium Carbonate | 12.1 | 2.1 | 0 |
| Press Flow Viscosity(SEC) | 43 | 64 | 111 |
| Properties: | | | |
| CLF @ 0 deg C. | 0.085 | 0.1 | 0.12 |
| CLF @ 20 deg C. | 0.22 | 0.21 | 0.25 |
| CLF @ 40 deg C. | 0.089 | 0.12 | 0.14 |

Examples 3 and 4 demonstrates damping improvement gained through the use of a combination of high aspect ratio fillers talc and mica while maintaining low viscosity and good rheology necessary for spray application.

EXAMPLES 5 and 6

| COMPOUND | Comparative Example 4 Parts by Weight | Example 5 Parts by Weight | Example 6 Parts by Weight |
|---|---|---|---|
| Bis A Epoxy Resin EEW = 187 | 15.8 | 15.8 | 15.8 |
| Bis A/Aliphatic Diepoxide Resin Polyglycol based mixture EEW = 280 | 8.1 | 8.1 | 8.1 |
| Aliphatic Diepoxide Resin Polyglycol based EEW = 320 | 20.8 | 20.8 | 20.8 |
| C7/C9 Alkyl Benzyl Phthalate | 6 | 6 | 6 |
| Dicyandiamide | 3.5 | 3.5 | 3.5 |
| PDMU | 1 | 1 | 1 |
| Glass Spheres | 4.4 | 4.4 | 4.4 |
| High Aspect Ratio Filler | 0 | 15 | 30 |
| Calcium Carbonate | 25 | 14 | 0 |
| Fumed Silica | 1.5 | 1.5 | 1.5 |
| Pigment | 0.3 | 0.3 | 0.3 |
| Ppt. Calcium Carbonate | 12.1 | 8.1 | 7.1 |
| Press Flow Viscosity(SEC) | 36 | 73 | 191 |
| DMA Properties: | | | |
| Tan Delta Peak @ Temp (C.) | 0.71 @ 56 | 0.67 @ 57 | 0.65 @ 59 |
| Loss Modulus Peak (Mpa) @ Temp (C.) | 306 @ 32 | 360 @ 30 | 392 @ 32 |

Examples 5 and 6 demonstrate damping improvement gained through the use of high aspect ratio mica while losing viscosity and rheology necessary for spray application.

EXAMPLE 7

| COMPOUND | Comparative Example 5 Parts by Weight | Example 7 Parts by Weight |
|---|---|---|
| Bis A Epoxy Resin EEW = 187 | 15.8 | 15.8 |
| Bis A/Aliphatic Diepoxide Resin Polyglcol based mixture EEW = 280 | 8.1 | 8.1 |
| Aliphatic Diepoxide Resin Polyglycol based EEW = 320 | 26.8 | 20.8 |
| Alkyl Benzyl Phthalate | 0 | 6 |
| Dicyandiamide | 3.5 | 3.5 |
| PDMU | 1 | 1 |
| Glass Spheres | 4.4 | 4.4 |
| Calcium Carbonate | 25 | 25 |
| Fumed Silica | 1.5 | 1.5 |
| Pigment | 0.3 | 0.3 |
| Ppt. Calcium Carbonate | 12.1 | 12.1 |
| Press Flow Viscosity(SEC) | 36.5 | 36 |
| DMA Properties: | | |
| Tan Delta Peak @ Temp (C.) | 0.67 @ 61 | 0.71 @ 56 |
| Loss Modulus Peak (Mpa) @ Temp (C.) | 326 @ 41 | 306 @ 32 |

Example 7 demonstrates the effect of plasticizer on peak damping and shift in damping temperature range.

EXAMPLE 8

| COMPOUND | Comparative Example 6 Parts by Weight | Example 8 Parts by Weight |
|---|---|---|
| Bis A Epoxy Resin EEW = 187 | 15.8 | 15.8 |
| Bis A/Aliphatic Diepoxide Resin Polyglcol based mixture EEW = 280 | 8.1 | 8.1 |
| Aliphatic Diepoxide Resin Polyglycol based EEW = 320 | 26.8 | 29.8 |
| Dicyandiamide | 3.5 | 3.5 |
| PDMU | 1 | 1 |

-continued

| COMPOUND | Comparative Example 6 Parts by Weight | Example 8 Parts by Weight |
|---|---|---|
| Glass Spheres | 4.4 | 4.4 |
| Calcium Carbonate | 25 | 25 |
| Rheology Additive | 1.5 | 1.5 |
| Pigment | 0.3 | 0.3 |
| Ppt. Calcium Carbonate | 12.1 | 12.1 |
| Press Flow Viscosity(SEC) | 36.5 | 29.5 |
| DMA Properties: | | |
| Tan Delta Peak @ Temp (C.) | 0.67 @ 61 | 0.72 @ 51 |
| Loss Modulus Peak (Mpa) @ Temp (C.) | 326 @ 41 | 320 @ 30 |

Example 8 demonstrates the ability to shift peak damping over the desired operating temperature range without significantly affecting damping performance.

EXAMPLES 9 and 10

| COMPOUND | Comparative Example 6 Parts by Weight | Example 9 Parts by Weight | Example 10 Parts by Weight |
|---|---|---|---|
| Bis A Epoxy Resin EEW = 187 | 15.8 | 15.8 | 15.8 |
| Bis A/Aliphatic Diepoxide Resin Polyglycol based mixture EEW = 280 | 8.1 | 8.1 | 8.1 |
| Aliphatic Diepoxide Resin Polyglycol based EEW = 320 | 26.8 | 26.8 | 26.8 |
| Dicyandiamide | 3.5 | 3.5 | 3.5 |
| PDMU | 1 | 1 | 1 |
| Glass Spheres | 0 | 2.2 | 4.4 |
| Calcium Carbonate | 25 | 25 | 25 |
| Rheology Additive | 1.5 | 1.5 | 1.5 |
| Pigment | 0.3 | 0.3 | 0.3 |
| Ppt. Calcium Carbonate | 16.5 | 14.3 | 12.1 |
| Press Flow Viscosity(SEC) | 25 | 31 | 36.5 |
| Specific Gravity (units) | 1.52 | 1.4 | 1.31 |
| DMA Properties: | | | |
| Tan Delta Peak @ Temp (C.) | 0.69 @ 58 | 0.66 @ 56 | 0.67 @ 61 |
| Loss Modulus Peak (Mpa) @ Temp (C.) | 244 @ 41 | 322 @ 38 | 326 @ 41 |

Examples 9 and 10 demonstrate the effect of glass spheres on material density while showing no negative effect on viscosity and a positive effect on peak damping efficiency.

EXAMPLE 11

The following components are mixed in a Ross mixer: 113.4 grams of bisphenol A epoxy resin (DER™ 331 available from The Dow Chemical Company), 170.1 grams of a polypropylene oxide based epoxy resin (DER™ 732 available from The Dow Chemical Company), 283.6 grams of dodecenyl succinic anhydride available from Lonza Inc., 31.7 grams of CAB-SIL TS 720 a hydrophobic fumed silica available from Cabot Corp, 4 grams of a boron trichloride amine complex Leecure 38-239B (available from Leepoxy Plastics, Inc.), 157.2 grams of Calcium carbonate and 240 grams of talc. The coating is applied to a electrocoated cold rolled steel panel at a thickness of 1.5 mm nominally. The applied coating is cured at 140° C. for 30 minutes.

The coating demonstrated a press flow viscosity of 21 seconds, a tensile at break of 1214 psi (8.37 mPa)and an elongation of 55 percent. The sample did not develop any chips, lifts or adhesion loss during the chip resistance test.

What is claimed is:

1. A one-part sprayable epoxy composition useful in coating substrates comprising a mixture of one or more flexible epoxy resins in amounts of from about 10 to about 60 weight percent, one or more rigid epoxy resins in amounts of from about 5 to about 40 weight percent, one or more curing agents for the epoxy resin which cures the formulation at a temperature of from about 60° C. to about 190° C. in an amount of from about 0.5 to about 5 weight percent, from 2.1 to about 50 percent by weight of a spherical filler, and from about 5 percent by weight to about 40 percent by weight of a high aspect ratio filler based on the weight of the formulation wherein the sum of the total amounts of the components is 100 percent by weight; wherein the composition has a viscosity of about 150,000 centipoise or less, can be sprayed on a substrate and after cure the composition exhibits a composite loss factor 0.05 or greater as measured according to SAE J1637 with a 2 mm coating.

2. A composition according to claim 1 wherein the rigid epoxy resin is a liquid bisphenol based epoxy resin and the flexible epoxy resin is a polyether based epoxy resin.

3. A composition according to claim 2 wherein the curing agent is an anhydride, a cyandiamide or a dicyandiamide.

4. A composition according to claim 3 which further comprises a catalyst for the reaction of the epoxy resins with the epoxy curing agent.

5. A composition according to claim 4 wherein the catalyst is a phenyl dimethyl urea, imidazole or boron trihalide.

6. Method for coating a sound damping flexible epoxy resin coating on to a substrate which comprises A) spraying a composition according to claim 1 onto a substrate, and B) curing the composition at a temperature of from about 60° C. to about 190° C.

7. A method according to claim 6 wherein the rigid epoxy resin is a liquid bisphenol based epoxy resin and the flexible epoxy resin is a polyether based epoxy resin.

8. A method according to claim 7 wherein the curing agent is an anhydride, a cyandiamide or a dicyandiamide.

9. A method according to claim 8 wherein the coating composition further comprises a catalyst for the reaction of the epoxy resins with the curing agent.

10. A method according to claim 9 wherein the catalyst is a urea, imidazole or a boron trihalide.

11. A substrate coated with a composition of claim 1 wherein the composition provides sound damping properties.

12. A coated substrate according to claim 11 wherein the coating further comprises a catalyst for the reaction of the epoxy resins with the curing agent.

13. A coated substrate according to claim 11 wherein the coated substrate exhibits a composite loss factor of 0.05 or greater as measured by SAE J1637.

14. A composition according to claim 1 wherein the median particle size of the high aspect ratio filler is from about 20 to about 70 microns.

15. A composition according to claim 1 wherein the amount of plasticizer in the composition is 0 percent.

16. A method according to claim 6 wherein the median particle size of the high aspect ratio filler is from about 20 to about 70 microns.

17. A method according to claim 6 wherein the amount of plasticizer is 0 percent by weight.

18. A coated substrate according to claim 11 wherein the median particle size of the high aspect ratio filler is from about 20 to about 70 microns.

19. A coated substrate according to claim 11 wherein the amount of plasticizer is 0 percent by weight.

* * * * *